United States Patent
Fan et al.

(10) Patent No.: US 6,873,381 B2
(45) Date of Patent: Mar. 29, 2005

(54) SYSTEM FOR CONTROLLING UNPOLARIZED ELECTROMAGNETIC RADIATION

(75) Inventors: Bunsen Fan, Peekskill, NY (US); Jian-feng Li, Yorktown Heights, NY (US); Le Li, Yorktown Heights, NY (US); Sadeg Faris, Pleasantville, NY (US)

(73) Assignee: Reveo, Inc., Elmsford, NY (US)

( * ) Notice: Subject to any disclaimer, the term of this patent is extended or adjusted under 35 U.S.C. 154(b) by 0 days.

(21) Appl. No.: 10/763,822

(22) Filed: Jan. 23, 2004

(65) Prior Publication Data

US 2004/0218116 A1 Nov. 4, 2004

Related U.S. Application Data

(63) Continuation of application No. 10/117,945, filed on Apr. 8, 2002, now Pat. No. 6,697,133.

(51) Int. Cl.$^7$ .................... G02F 1/1333; G02F 1/1335; C09K 19/02
(52) U.S. Cl. .................... 349/98; 349/88; 349/115; 349/176
(58) Field of Search .................... 349/88, 98, 115, 349/175, 13–16, 176

(56) References Cited

U.S. PATENT DOCUMENTS

| | | | | | |
|---|---|---|---|---|---|
| 5,364,557 | A | * | 11/1994 | Faris ...................... | 252/299.01 |
| 5,498,450 | A | * | 3/1996 | Akashi et al. ........... | 428/423.1 |
| 5,686,979 | A | * | 11/1997 | Weber et al. .................. | 349/96 |
| 5,691,789 | A | * | 11/1997 | Li et al. ........................ | 349/98 |
| 5,897,727 | A | * | 4/1999 | Staral et al. .................. | 156/99 |
| 5,940,150 | A | * | 8/1999 | Faris et al. ................... | 349/16 |
| 6,071,438 | A | * | 6/2000 | Leigeber et al. ............ | 252/585 |
| 6,072,549 | A | * | 6/2000 | Faris et al. ................... | 349/16 |
| 6,133,980 | A | * | 10/2000 | Faris .......................... | 349/176 |

* cited by examiner

*Primary Examiner*—Tarifur R. Chowdhury

(57) ABSTRACT

A light controlling film is described comprising a polymerized polymer network of a crosslinked high molecular weight polymeric material and a low molecular weight cholesteric liquid crystal (CLC) material, wherein the high molecular weight and the low molecular weight form a material having cholesteric liquid crystal (CLC) order such that the film is a reflective circular polarizer whose bandwidth is controllable by an electric field impressed in the film.

1 Claim, 4 Drawing Sheets

SYSTEM FOR CONTROLLING UNPOLARIZED ELECTROMAGNETIC RADIATION

This is a continuation of application Ser. No. 10/117,945, filed Apr. 8, 2002, now U.S. Pat. No. 6,697,133.

RELATED CASES

The following applications are related to the present invention: copending application Ser. No. 08/805,603 entitled "Electro-optical glazing structures having total-reflection and transparent modes of operation for use in dynamical control of electromagnetic radiation" by Sadeg M. Faris and Le Li, filed Feb. 26, 1997, which is a continuation-in-part of: copending application Ser. No. 08/739,467 entitled "Super Broadband Reflective Circularly Polarizing Material And Method Of Fabricating And Using Same In Diverse Applications", by Sadeg M. Faris and Le Li filed Oct. 29, 1996, which is a is a Continuation-in-Part of application Ser. No. 08/550,022 (Now U.S. Pat. No. 5,691,789) entitled "Single Layer Reflective Super Broadband Circular Polarizer and Method of Fabrication Therefor" by Sadeg M. Faris and Le Li filed Oct. 30, 1995; copending application Ser. No. 08/787,282 entitled "Cholesteric Liquid Crystal Inks" by Sadeg M. Faris filed Jan. 24, 1997, which is a Continuation of application Ser. No. 08/265,949 filed Jun. 2, 1994, which is a Divisional of application Ser. No. 07/798,881 entitled "Cholesteric Liquid Crystal Inks" by Sadeg M. Faris filed Nov. 27, 1991, now U.S. Pat. No. 5,364,557; copending application Ser. No. 08/715,314 entitled "High-Brightness Color Liquid Crystal Display Panel Employing Systemic Light Recycling And Methods And Apparatus For Manufacturing The Same" by Sadeg Faris filed Sep. 16, 1996; copending application Ser. No. 08/743,293 entitled "Liquid Crystal Film Structures With Phase-Retardation Surface Regions Formed Therein And Methods Of Fabricating The Same" by Sadeg Faris filed Nov. 4, 1996; and an application submitted simultaneously with the present application entitled BROADBAND SWITCHABLE POLARIZER Inventors: Jian-feng Li, Le Li, Bunsen Fan, Yingqiu Jiang, and Sadeg Faris. Each of the above identified Applications and patents are commonly owned by Reveo, Inc, and are incorporated herein by reference in their entirety.

BACKGROUND OF THE INVENTION

1. Field of Invention

The present invention relates generally to reflective polarizing films where the reflectivity may be varied by impressing an electric field across the film. Such films may be used to great advantage in electro-optical glazing structures having reflection, semi-transparent, and/or transparent modes of operation which are electrically-switchable for use in dynamically controlling electromagnetic radiation flow in diverse applications. In particular, the present invention relates to reflective polarizing films where the bandwidth of the reflectivity may be controlled by impressing an electric field across the film.

2. Brief Description of the Literature

Broadband reflecting polarizers were introduced in application Ser. No. 08/550,022 (now U.S. Pat. No. 5,691,789) entitled "Single Layer Reflective Super Broadband Circular Polarizer and Method of Fabrication Therefor" by Sadeg M. Faris and Le Li which was filed Oct. 30, 1995. Such broadband polarizers are made by producing a single layer having cholesteric liquid crystal order where the pitch of the liquid crystal order varies in a non linear fashion across the layer. A narrow band, switchable polarizing single layer reflector is disclosed in European patent application 0 643 121 A, published Mar. 15, 1995. A switchable polarizing single layer reflector having a broader bandwidth is disclosed in PCT application WO97/2358, published Jul. 3, 1997. General references on polymer dispersed liquid crystals may be found in detail in "Polymer Dispersed Liquid crystal displays", by J. W. Doane, a chapter in "Liquid Crystals", Ed. B. Bahadur, World Scientific Publishing, Singapore, and "CLC/polymer dispersion for haze-free light shutters, by D. Yang et al. Appl. Phys. Lett. 60, 3102 (1992). Smart Window Design is treated in "Electrochromism and smart window design", by C. Granqvist, Solid State Ionics 53–56 (1992) and "large scale electochromic devices for smart windows and absorbers", by T. Meisel and R. Baraun, SPIE 1728, 200 (1992). The above identified US patents and other references are hereby incorporated by reference.

OBJECTS OF THE PRESENT INVENTION

It is an object of the invention to provide a reflective polarizing film having a bandwidth which is controllable by an electric field.

It is an object of the invention to provide a "smart window" using a polarizing reflective film having a very wide bandwidth which is controllable by an electric field.

SUMMARY OF THE PRESENT INVENTION

The present invention provides a single layer polarizing reflective film comprising a crosslinked polymer matrix mixed with low molecular weight liquid crystal molecules. The low molecular weight liquid crystal molecules are oriented with respect to the surface of the film and to each other in cholesteric order. The ratio of the amount of liquid crystal molecules to the amount of cross-linked polymer is chosen so that the liquid crystal molecules may move reversibly in an electric field. The movement of the low molecular weight molecules perturbs the cholesteric liquid crystalline order responsible for the reflectivity of the polarized light. If the composition of the film is uniform, the polarized reflectivity of the film has a very narrow bandwidth when there is no electric field impressed in the film. As the electric field is increased, the bandwidth of the polarized reflectivity increases. There is sufficient high molecular weight cross linked polymer material to ensure that the film is not liquid, and to ensure that the low molecular weight material does not diffuse after manufacture of the film, and to ensure that the low molecular weight material returns to the cholesteric liquid crystal ordered state when the field is removed.

DETAILED DESCRIPTION OF THE PRESENT INVENTION

Figure 1:
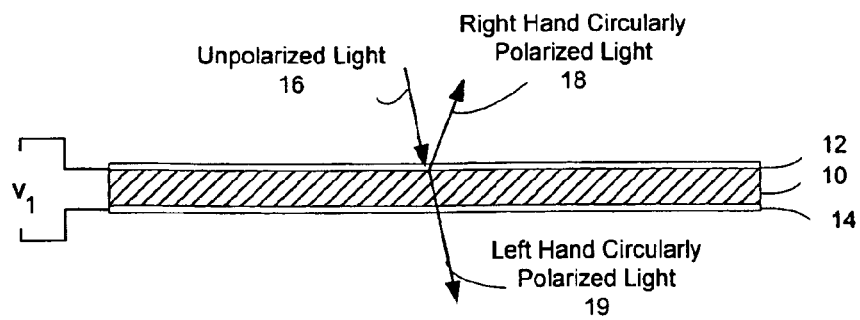
FIG. 1 shows the film 10 of the invention.

Since the early attempt of utilizing cholesteric film as optical filter and the effort on polymer encapsulated nematic liquid crystals for display, much attention has been focused on trying to bring polymeric liquid crystals and cholesteric liquid crystals together to make devices for light control application. (See, for example J. Adams, W. Hass, J. Dailey, Journal of Applied Physics, 1971, and J. L. Fergason, Society for Information Display Digest, 1985.). We report new polarizers made from a high molecular weight reactive cholesteric liquid crystal polymer material mixed with conventional low molecular weight liquid crystal(s) and a chiral dopant(s). The resulting polarizers reflect circular polarized light matching their spiral senses. A 10 µm thick polarizers with a bandwidth from 440 nm to 660 nm, can be switched from reflection mode to transmission mode by applying an electric field. This broad band switchable polarizer is the subject of a copending application entitled BROADBAND SWITCHABLE POLARIZER, with Inventors Jian-feng Li, Le Li, Bunsen Fan, and Yingqiu Jiang and Sadeg Faris, and which is assigned to the assignee of the present application, and submitted on the same date as the present application, and which is hereby incorporated by reference.

Using a material blend containing a reactive cholesteric liquid crystalline (CLC) compound, other non-reactive liquid crystal(s) and chiral dopant(s), the switchable polarizer is created by a mechanism termed as ultraviolet (UV) polymerization induced molecular redistribution (PIMRD) which is responsible for creating a nonlinear helical pitch distribution along the CLC helical axis. This redistribution is described in great detail in Le Li and Sadeg M. Faris, Single Layer Reflective Super Broadband Circular Polarizer And Method of Fabrication Therefor, U.S. Pat. No. 5,691,789, 1997. Cross linking or polymerization of the high molecular weight material takes place at different rates in different places in the material, and the non-reactive compounds are pushed out from the more cross linked or polymerized material and segregated as reported in an article by Yang, D. K., Chien, L. -C., and Doane, J. W., Appl. Phys. Lett. 60, p3102 (1992). As a result, some diffusing non-reactive molecules are "trapped" in the polymer network during the polymerization. At sites where the polymerization rate is lower, more non-reactive nematic liquid crystalline molecules are accumulated and the helical pitch become longer. Ultimately, this PIMRD mechanism yields a non-uniform helical pitch distribution throughout the mixture, resulting in a switchable broadband reflective polarizer.

The non linear pitch distribution may be attained by polymerizing with light, where the intensity of the light varies throughout the layer of material. This happens naturally if the material mixture absorbs the light strongly. The mixture is merely irradiated at a low enough intensity to allow diffusion of the non-reactive nematic liquid crystalline molecules from one surface of the mixture to the other. Appropriate light absorbing molecules may be added to the mixture, or a wavelength of the light may be chosen which is strongly absorbed in one of the constituents of the mixture which is necessary for the function of the broad band polarizer. Other methods of polymerization as known in the art may be used as well, so long as the requisite nonlinear light absorption results. Such methods as electron or other beam irradiation, or heating with a large temperature gradient across the material, could also be used.

We have found a very different effect when we crosslinked the polymer with very high intensity UV light so that the low molecular weight molecules could not diffuse far in the approximately 1 second polymerization time. We found that the resulting film had a very narrow bandwidth (70 mm), but that when an electric field was impressed across the field, the polarizing reflective bandwidth, surprisingly, broadened to 350 nm. This controllable bandwidth film is the subject of the present application.

Using a material blend containing a reactive cholesteric liquid crystalline (CLC) compound, other non-reactive liquid crystal(s) and chiral dopant(s), this bandwidth changeable polarizer is created by a very fast UV curing process which is opposite to the PIMRD process. The detailed first recipe is a mixture of 12% by weight of a high molecular weight (HMW) CLC polymer [BASF 181(25% bisacrylates)], 61% of a low molecular weight nematic material E44 obtained from Merck, 25% of a chiral additive CB15 obtained from Merck, and 1.9% of a photoinitiator IG 184 from Ciba Geigy. In this process, a strong UV source (1 W/cm$^2$) and higher concentration of photo-initiator had been used. As a result, diffusion of the low molecular weight molecules was restricted during the polymerization. In consequence, a much more uniform helical pitch distribution throughout the mixture was obtained, resulting in a narrow band width (70 nm) reflective polarizer when the electric field impressed in the film was low.

A special right-handed reactive cholesteric liquid crystalline compound was mixed with a commercially available nematic liquid crystal and certain amount of chiral dopant. The purpose of adding chiral dopant is again to adjust the helical pitch. Photo-initiator was also added to start the polymerization process. A commercial high power UV light source, wavelength centered at 365 nm, was used to polymerize reactive liquid crystal component in the mixture. Spectrometry was carried out with a Perkin-Elmer Lambda 19.

The sample, made of two ITO glass sheets coated with rubbed polyimide and separated by a thinner glass bead spacers (8 µm), was filled with the new liquid crystal mixture, and then irradiated with a intense UV light source at room temperature for a short period of time (in the order of second).

Preferred recipes have also been developed. They are listed as follows:

Recipe 2#: CM181 (365 nm) (BASF)=12%, CB15=25%, E44=61%, IG184=2%. d=10 micrometer, curing temperature 25° C., UV intensity 1 W/cm$^2$. Initial bandwidth 600–670 nm when no voltage is applied; with a voltage of 26V(DC), the bandwidth broadens from 500–740 nm (right-handed), switching voltage 26V (DC.). CM181 cross-linking density is low.

Recipe 3#: CM171 (507 nm)=12%, CB15=25%, E44=61%, IG184=2%. d=10 micrometer, curing temperature 25° C., WV intensity 1 W/cm$^2$. Initial bandwidth 680–770 nm when no voltage is applied; with a voltage of 30V(DC), the bandwidth broadens to cover from 450–850 nm (right-handed), switching voltage 30V (DC). CM171 cross-linking density is medium.

Recipe 4#: CM181 (365 nm)=12%, CB15=26%, E44=60%, IG184=2%. d=8 micrometer, curing temperature 25°

C., UV intensity 1 W/cm². Initial bandwidth 620–680 nm when no voltage is applied; with a voltage of 45V(DC), the bandwidth from 470–850 nm (right-handed), switching voltage 45V (DC). CM171 cross-linking density is low.

Recipe 5#: CM181 (365 nm)=12%, CB15=26%, E44= 60%, IG184=2%. d=8 micrometer, curing temperature 25° C., UV intensity 1 W/cm². Initial bandwidth 620–680 nm when no voltage is applied; with a voltage of 45V(DC), the bandwidth from 470–850 nm (right-handed), switching voltage 45V (DC). CM171 cross-linking density is low.

Various Embodiments of the Invention may be Understood by Reference to the Figures FIG. 1 shows the film 10 of the invention comprising a cross linked or polymerized material having a high molecular weight component and a low molecular weight CLC component.

Film 10 is contacted by electrically conducting materials 12 and 14 which may have a voltage $V_1$ applied to impress and electric field in the material of the invention. The materials 12 and 14 may contact the film 10 or be closely adjacent film 10. Unpolarized light 16 is shown incident on film 10 through conducting material 12, which is transparent to the light 16. Right hand circularly polarized light 18 is shown reflecting from film 10, while left hand circularly polarized light is shown transmitted through film 10 and through material 14. If material 14 does not absorb light, the left hand circularly polarized light remaining after transmission through film 10, the device of FIG. 1 is a polarizer. If light 19 is transmitted, the device of FIG. 1 is a polarizing beamsplitter. When the field is impressed in film 10 by raising the voltage $V_1$, the bandwidth of the right hand circularly polarized light 18 broadens. If the light incident on to film 10 is right hand circularly polarized, the voltage may be used to change the device of FIG. 1 from a narrow band reflector of the light to a broad band reflector of the light.

Figure 2:
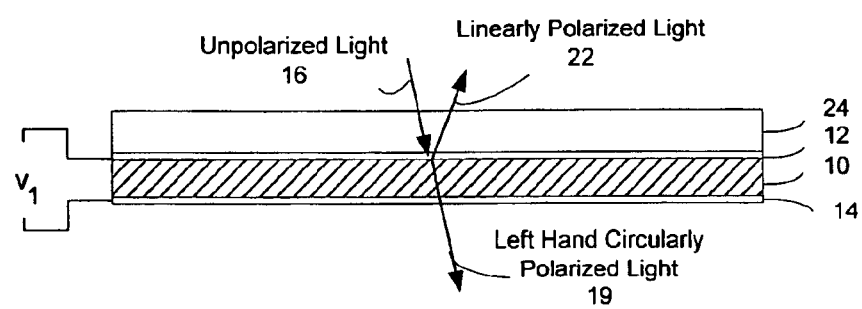
FIG. 2 shows the device of FIG. 1 with the addition of a π/4 phase retardation plate.

FIG. 2 shows the device of FIG. 1 with the addition of a π/4 phase retardation plate 24. Unpolarized light incident on the device of FIG. 2 will be result in linearly polarized light being controllably reflected from the device. If linearly polarized light of the correct polarization is incident on the device of FIG. 2, the voltage may be used to control the bandwidth of the reflected light or the width of the "notch" in the transmitted light.

Figure 3:
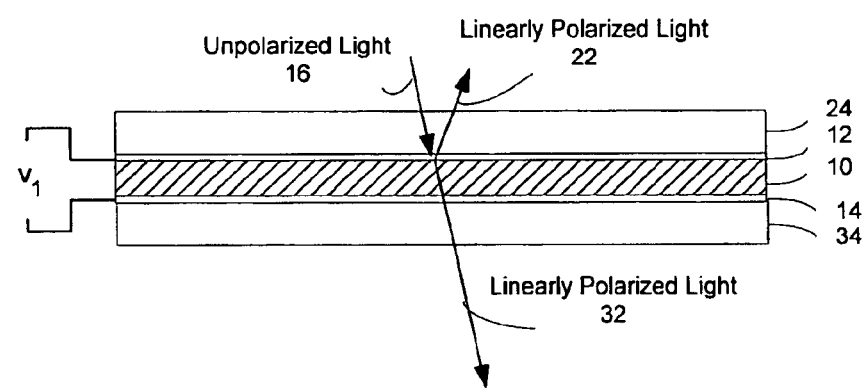
FIG. 3 shows an additional embodiment of the device of FIG. 2.

FIG. 3 shows an additional embodiment of the device of FIG. 2, whereby an additional π/4 phase retardation plate 34 converts the circularly polarized light remaining from the initially unpolarized incident light to a linearly polarized light beam 32 which has opposite polarization to the reflected beam 22.

Figure 4:
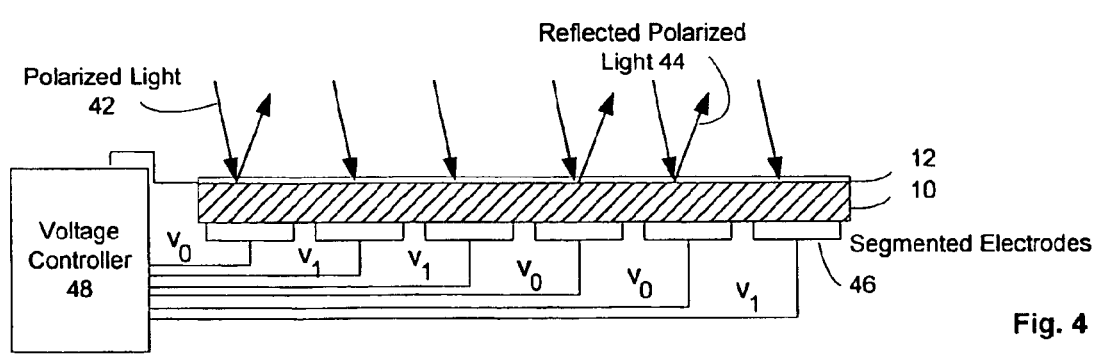
FIG. 4 shows the film of the invention used for display purposes.

FIG. 4 shows an embodiment of the film of the invention used for display purposes. The electric field in the film 10 of the invention is controlled to vary spatially across the area of the film 10 by a voltage controller 48 applying varying voltages to segmented electrodes 46. The bandwidth of light 42 is changed from the various areas of the film to give a display. In the case shown, polarized light may be used for light 42, and the polarized light in transmission may also be used as a display.

Figure 5:
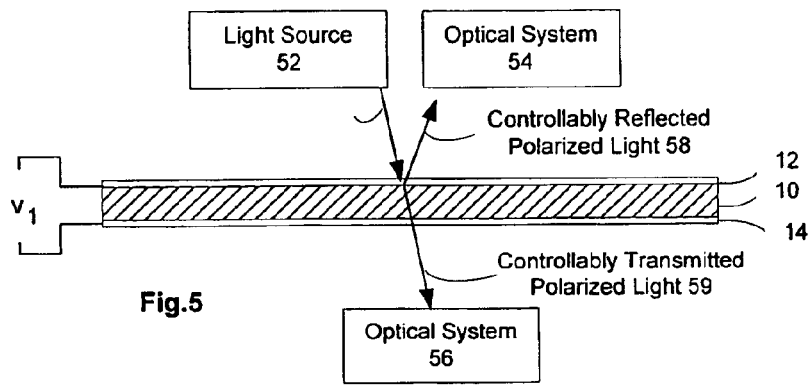
FIG. 5 shows an optical system using the film of the invention.

FIG. 5 shows an optical system using the film of the invention, whereby the controllable bandwidth light beam 58 may be used in further optical systems 54, and the transmitted light beam 59 may have a "notch" controllable by the voltage applied across the conducting materials 10 and 12.

Figure 6:
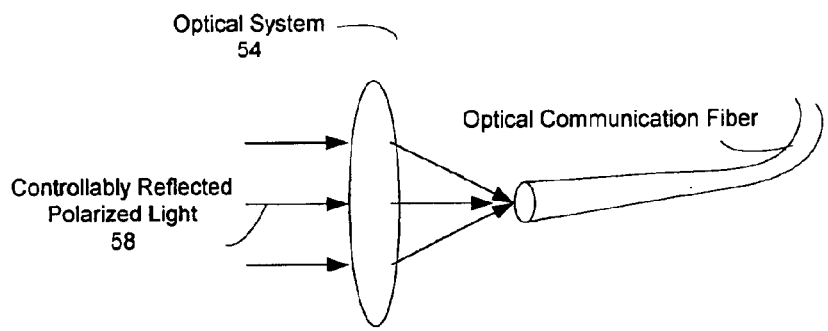
FIG. 6 shows an optical system for injecting a controlled bandwidth polarized light beam into an optical communication fiber 64.

FIG. 6 shows one example of an optical system 54 for injecting a controlled bandwidth polarized light beam 58 through a lens 62 into an optical communication fiber 64.

Figure 7:
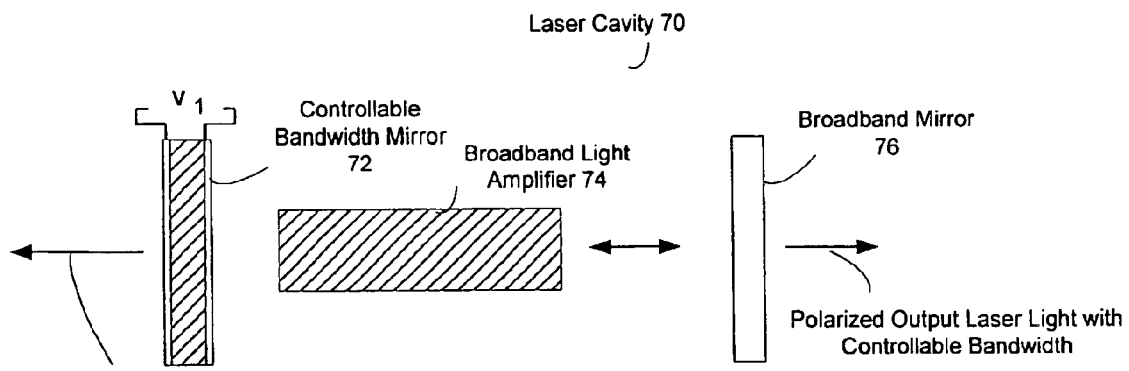
FIG. 7 shows the voltage controlled film of the invention as a cavity element in a laser cavity.

FIG. 7 shows an embodiment using the voltage controlled film of the invention as a cavity element in a laser cavity 70. The controllable bandwidth polarizing film is used here as cavity reflector 72 for a cavity comprising the controllable bandwidth polarizing film, a broadband light amplifier 74, and a broadband mirror 76. The device of FIG. 7 will lase and produce a controllable bandwidth of laser light at wavelengths where the reflectivity of the mirror 72 reaches a threshold value. The laser output may be drawn either from the mirror 72 or from the mirror 76, depending on the transmissions of the cavity reflectors.

Figure 8:
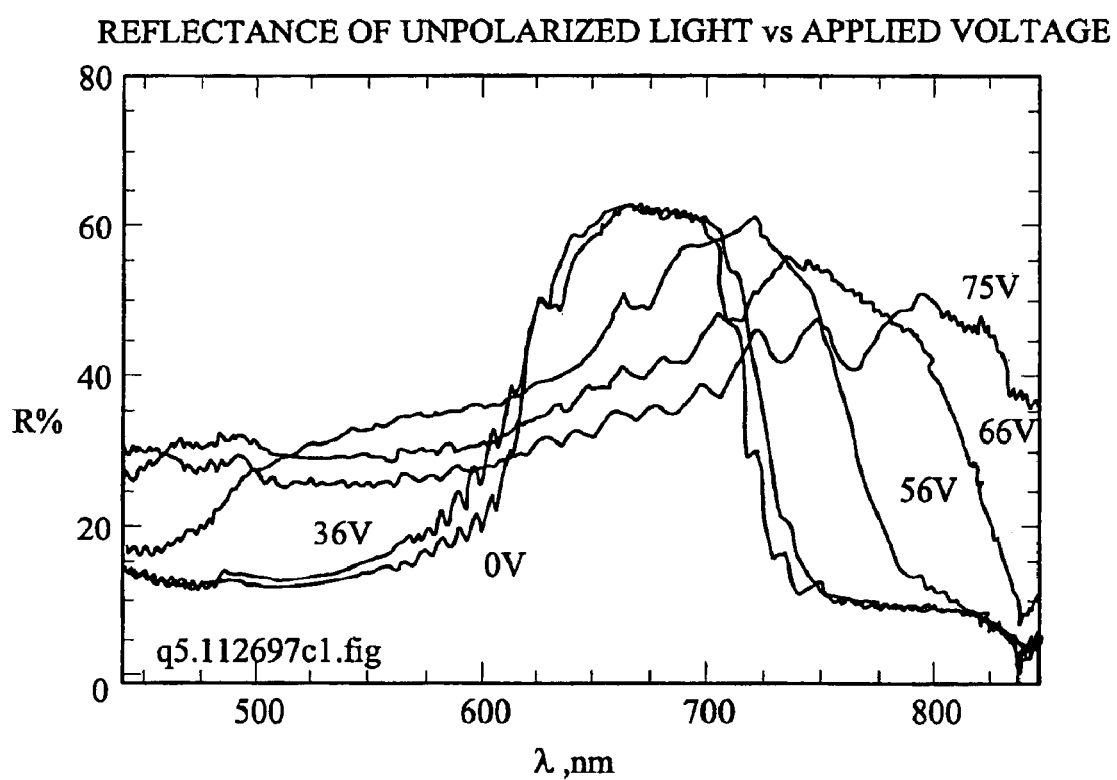
FIG. 8 shows the reflection spectra for unpolarized light of the bandwidth changeable polarizer for different values of the voltage across the film.

FIG. 8 shows the reflection spectra for unpolarized light of the bandwidth changeable polarizer of recipe #1 for different values of the voltage across the film. With electric field off, the bandwidth is narrow, and only amounts to about 70 nm (FWH. When a DC electric field of 7 V/mm is applied, the bandwidth is then broadened to 350 nm. Scattering plays an insignificant role here. By visual inspection, we found, with DC electric field applied to the sample, that haze was not noticeable by naked eyes.

Figure 9:
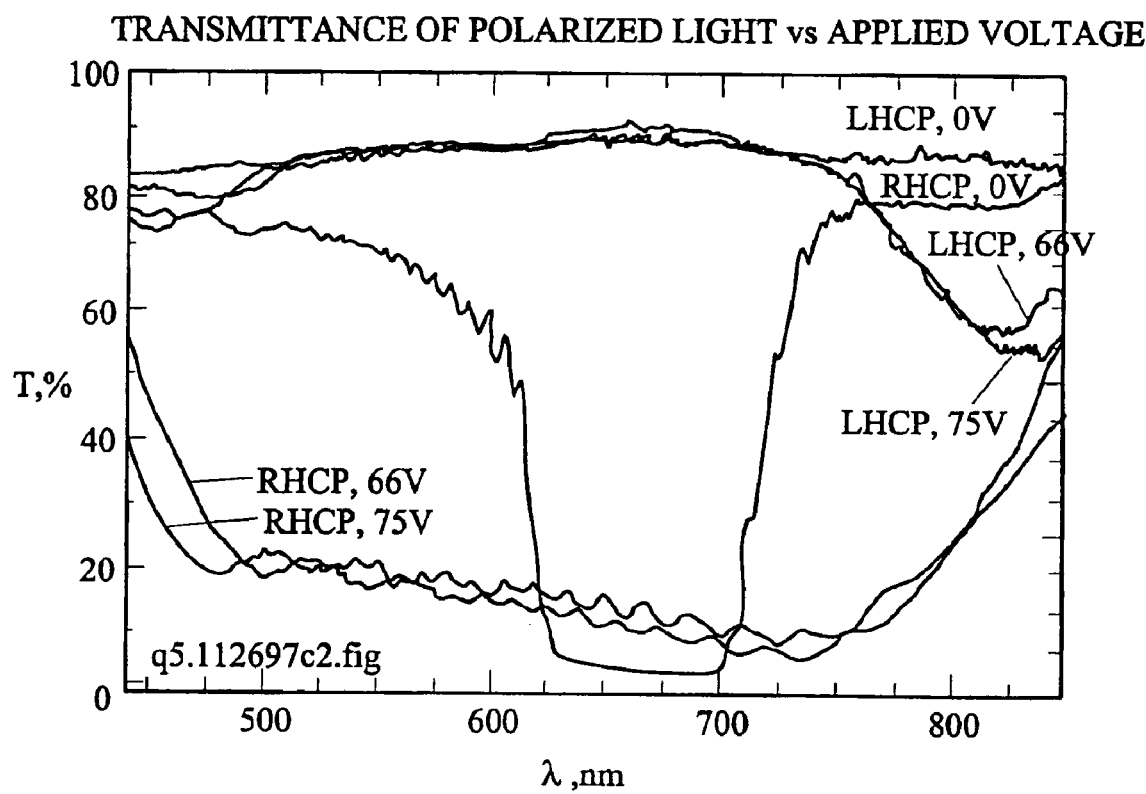
FIG. 9 shows the transmission spectra for right and left handed circularly polarized (RHCP and LHCP) light of a film of the invention.

FIG. 9 shows the transmission spectra for right and left handed circularly polarized (RHCP and LHCP) light for a sample of film made from recipe #1.

We believe that, due to the restriction on the diffusion during the polymerization of the mixture by using strong UV light source and higher photo-initiator concentration, the helical pitch distribution of the sample is narrow, and the distribution of the chiral polymer is also uniform though out the sample. When DC electric field was applied, the polymer network with its own resulted helical structure was not affected due to its high cross-linking density. However, the non-reactive cholesteric liquid crystal components are affected by the electric field. The helical structure was untwisted. Below the threshold field, due to the constraint form the surfaces (thin sample, 8 $\mu$m) and the cross-linked cholesteric polymer, the non-reactive molecules closer to the polymer network would maintain their orientations, those are not so close to the polymer network would be aligned along the field. The result was a deformed spiral. Therefore, the reflection band of such a helical structure is no longer narrowly centered at the pitch, rather became a much broader one as we had observed in our laboratory. We had also observed that such a untwisting process has a intrinsic time constant in the order of seconds.

We claim:

1. A system for controlling unpolarized electromagnetic radiation comprising:

a substrate;

a single layer of material on the substrate, the material reflecting the electromagnetic radiation, the reflected electromagnetic radiation being polarized, the reflected electromagnetic radiation having a bandwidth;

an electric field generator for generating a variable electric field in the layer of material; and a controller for controlling the electric field generator;

whereby the controller controls the electric field generator to generate a field in the layer of material and whereby the bandwidth of the reflected electromagnetic radiation changes in response to the change of the electric field.

* * * * *